(12) United States Patent
Jin et al.

(10) Patent No.: US 11,086,568 B2
(45) Date of Patent: Aug. 10, 2021

(54) MEMORY SYSTEM FOR WRITING FRACTIONAL DATA INTO NONVOLATILE MEMORY

(71) Applicant: Toshiba Memory Corporation, Tokyo (JP)

(72) Inventors: Nan Jin, Yokohama Kanagawa (JP); Ryoichi Kato, Yokohama Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 44 days.

(21) Appl. No.: 16/559,147

(22) Filed: Sep. 3, 2019

(65) Prior Publication Data

US 2020/0301612 A1 Sep. 24, 2020

(30) Foreign Application Priority Data

Mar. 22, 2019 (JP) .............................. JP2019-055415

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/068* (2013.01); *G06F 3/0656* (2013.01)

(58) Field of Classification Search
CPC .... G06F 3/0659; G06F 3/0604; G06F 3/0656; G06F 3/068; G06F 12/0802; G06F 12/0866; G06F 12/0868
See application file for complete search history.

(56) References Cited

U.S. PATENT DOCUMENTS

| 8,327,063 | B2 | 12/2012 | Shiga et al. | |
| 2008/0155182 | A1 | 6/2008 | Kudo | |
| 2017/0017413 | A1* | 1/2017 | Aston | .................. G06F 3/0659 |

FOREIGN PATENT DOCUMENTS

JP 2005182538 A 7/2005

* cited by examiner

*Primary Examiner* — Shawn X Gu
(74) *Attorney, Agent, or Firm* — Kim & Stewart LLP (57) ABSTRACT

According to one embodiment, a memory system includes a volatile memory, a nonvolatile memory and a controller circuit. The controller circuit configured to control the volatile memory and the nonvolatile memory and to perform a write process and a non-volatilization process. The controller circuit is further configured to, during the write process, store write data in the volatile memory, and during the non-volatilization process, upon determining that data size stored in the write buffer being less than unit of writing of the nonvolatile memory, suspend completion of the non-volatilization process and not return a notification of completion of the non-volatilization process.

15 Claims, 8 Drawing Sheets

MEMORY SYSTEM FOR WRITING FRACTIONAL DATA INTO NONVOLATILE MEMORY

CROSS-REFERENCE TO RELATED APPLICATIONS

This application is based upon and claims the benefit of priority from Japanese Patent Application No. 2019-055415, filed Mar. 22, 2019, the entire contents of which are incorporated herein by reference.

FIELD

Embodiments described herein relate generally to a memory system.

BACKGROUND

In recent years, memory systems provided with nonvolatile memories are widely used. As one of such memory systems, for example, a solid state drive (SSD) provided with a nonvolatile memory such as NAND flash memory is known. In a memory system such as the SSD, a command (for example, a flush command or the like) to store data in a non-volatile manner may be used. Such a command is used by the host to request the memory system to execute a non-volatilization process to write data initially stored in a volatile manner into nonvolatile memory.

DETAILED DESCRIPTION

In general, according to one embodiment, a memory system includes a volatile memory, a nonvolatile memory and a controller circuit. The controller circuit configured to control the volatile memory and the nonvolatile memory and to perform a write process and a non-volatilization process. The controller circuit is further configured to, during the write process, store write data in the volatile memory, and during the non-volatilization process, upon determining that data size stored in the write buffer is less than a unit of writing of the nonvolatile memory, suspend completion of the non-volatilization process and not return a notification of completion of the non-volatilization process.

Figure 1:
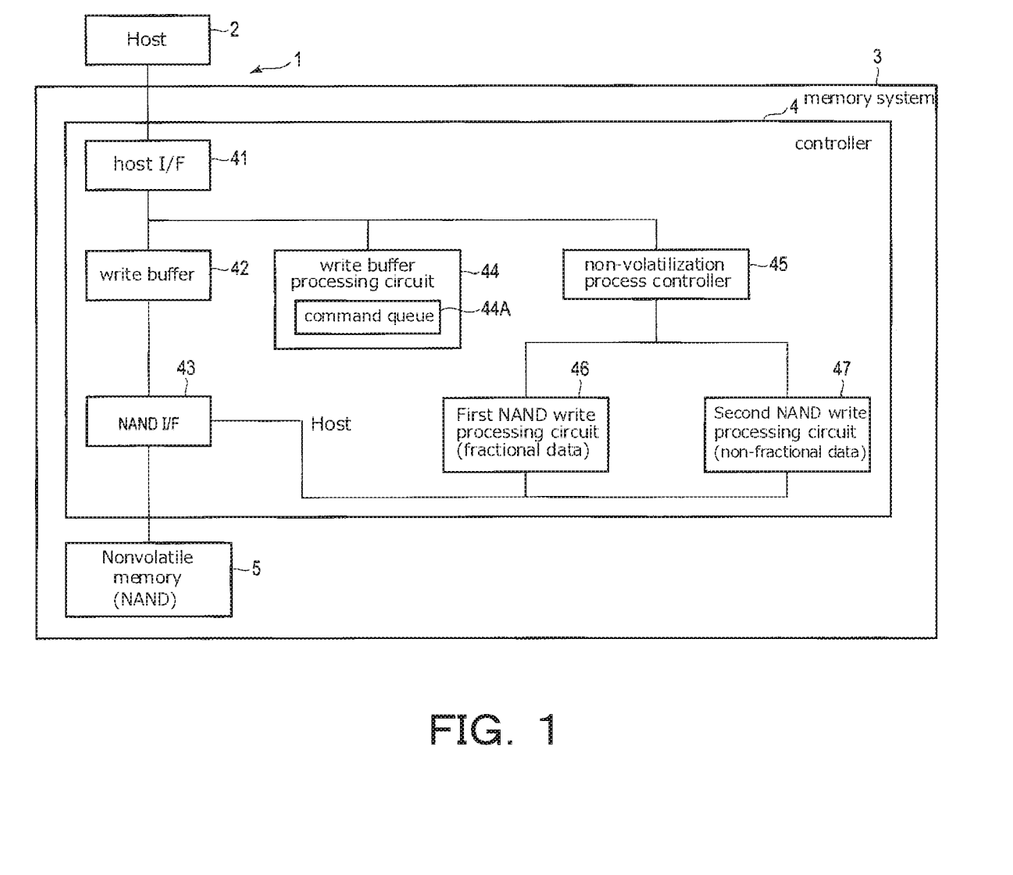
FIG. 1 is a block diagram showing a configuration example of an information processing system including a memory system according to an embodiment.

FIG. 1 is a block diagram showing a configuration example of an information processing system 1 including a memory system according to an embodiment.

The information processing system 1 includes a host (or a host device) 2 and a memory system 3. The host 2 may be a personal computer, a server, a mobile phone, an imaging device, a mobile terminal such as a tablet PC or a smartphone, or an -on-vehicle terminal such as a car navigation system.

The memory system 3 is, for example, a storage device configured to write data to the nonvolatile memory and read data from the nonvolatile memory. The memory system may be, for example, a solid state drive (SSD) or a memory card. Hereinafter, the case where the memory system is implemented as a solid state drive (SSD) is described.

The memory system 3 functions as a storage device for the host 2 which is an information processing device external to the memory system 3. The memory system 3 may be incorporated in the information processing device or may be connected to the information processing device via a wiring cable or a wireless network.

As an interface for interconnecting the host 2 and the memory system 3, SCSI, Serial Attached SCSI (SAS), ATA, Serial ATA (SATA), PCI Express (PCIe)®, Ethernet®, Fibre Channel, NVM Express (NVMe)®, Universal Serial Bus (USB), Mobile Industry Processor Interface (MIPI), UniPro, etc. may be used.

The memory system 3 includes a controller 4 and a nonvolatile memory 5. The nonvolatile memory 5 is, for example, NAND flash memory. The controller 4 is electrically connected to the nonvolatile memory 5. The controller 4 is a memory controller that controls the nonvolatile memory 5. The controller 4 may be implemented as a circuit such as a system-on-a-chip (SoC).

The nonvolatile memory 5 includes one or more NAND flash memory chips, each chip having a memory cell array. The memory cell array has a plurality of memory cells arranged in a matrix. The memory cell array of the nonvolatile memory 5 includes a plurality of blocks (e.g., physical blocks). Each of these blocks is a unit for erasing data. Each of the plurality of blocks includes a plurality of pages. Each page is a unit of data writing and reading.

The memory cells of the nonvolatile memory 5 may be programmed according to a single level cell (SLC) mode, as a result of which 1 bit data is stored per memory cell. Alternatively, the memory cells of the nonvolatile memory 5 may be programmed according to a multi-level (MLC) mode, as a result of which 2-bit data is stored per memory cell, a triple-level (TLC) mode, as a result of which 3-bit data is stored per memory cell, or a quad level (QLC) mode, as a result of which 4-bit data is stored per memory cell. Furthermore, the memory cells of the nonvolatile memory 5 may be programmed according to a combination of the modes described above.

In this embodiment, although not limited thereto, a case where the nonvolatile memory 5 is programmed according a TLC mode will be described.

The controller 4 includes a host interface (host I/F) 41, a write buffer 42, a NAND interface (NAND I/F) 43, a write buffer processing circuit 44, a non-volatilization process controller 45, a first NAND write processing circuit for fractional data, a second NAND write processing circuit 47 for non-fractional data, and the like.

The host interface 41 is a hardware interface circuit that processes signals communicated between the memory system 3 and the host 2, which is an information processing apparatus outside the memory system 3. The host interface 41 processes signals corresponding to various commands and write data received from the host 2 and transmits signals corresponding to a response and data to the host 2. Examples of the commands received include a write command, a read command, a flush command, and the like.

The write command is a command for requesting the memory system 3 to write data. The write command designates a logical address (e.g., start logical address), a length, a data pointer and the like corresponding to data to be written (write data). The start logical address indicates the first logical address of the logical address range corresponding to the write data. This starting logical address may be expressed by a logical block address (LBA) or may be expressed by a logical cluster address (LCA). The LBA designates an address in the logical address space in a unit of logical blocks such as sectors. The LCA designates an address in the logical address space in a unit of clusters.

One cluster includes continuous sectors (e.g., 8 sectors, 16 sectors, or 32 sectors, etc.). For example, in the case where one cluster includes eight sectors and the size of one sector is 512 bytes, the size of one cluster is 4 kilobytes (4 KB).

The read command is a command for requesting the memory system 3 to read data. The read command specifies the start logical address corresponding to the data to be read, the length of the data to be read, and a data pointer indicating the position in the host memory to which the data to be read is to be transferred.

The flush command requests the memory system 3 to execute the process of writing data initially stored in the write buffer 42 into the nonvolatile memory 5 (the process also referred to as "non-volatilization process").

The flush command requests an execution of the non-volatilization process to write all data which has been stored in the write buffer 42 before the flush command is issued, to the nonvolatile memory 5. For example, the flush command is used to commit data corresponding to all commands completed before issuing the flush command, to the non-volatile memory 5. The target data of the non-volatilization process corresponding to the flush command includes all data up to the end position of the data stored in the write buffer 42 when the flush command is issued.

Another example of a command to execute the non-volatilization process includes Write-FUA (Force Unit Access) command. The Write-FUA command is a write command in which Force Unit Access (FUA) is enabled. The FUA enforces a rule that requires I/O data to reach a nonvolatile state before the I/O is considered complete. The Write-FUA command is a command having a function equivalent to a pair of the write command and flush command in this embodiment.

The write buffer 42 is a volatile memory that temporarily stores write data received by the memory system 3. The write buffer 42 is, for example, a static RAM (SRAM) or a dynamic RAM (DRAM).

The NAND interface 43 is a hardware interface that performs communication between the memory system 4 and the nonvolatile memory 5. The NAND interface 43 may be connected to a plurality of NAND flash memory chips included in the nonvolatile memory 5 via a plurality of channels.

The write buffer processing circuit 44 receives a command from the host 2 via the host I/F 41, and stores the received command in the command queue 44A in the controller 4. The command queue 44A may exist in the write buffer processing circuit 44.

The write buffer processing circuit 44 acquires the command to be processed from a group of commands stored in the command queue 44A. When the command to be processed is a write command, the write buffer processing circuit 44 receives the write data corresponding to the write command from the host 2. Then, the write buffer processing circuit 44 stores the received write data in the write buffer 42. Furthermore, the write buffer processing circuit 44 may execute a process of transmitting the command (write command) to the non-volatilization process controller 45.

Even when the command to be processed is a command that requests non-volatilization of data (for example, a flush command), the write buffer processing circuit 44 may execute a process of transmitting the command (for example, a flush command) to the non-volatilization process controller 45.

The non-volatilization process controller 45 selectively uses the first NAND write processing circuit 46 for fractional data and the second NAND write processing circuit 47 for non-fractional data when executing processing to store write data stored in the write buffer 42 into the nonvolatile memory 5. The non-volatilization process controller 45 determines a storage position (i.e., write destination position) in the nonvolatile memory 5 to which write data is to be written. The write destination position may be determined, for example, for each piece of data having the same size as a unit of writing to the nonvolatile memory 5.

In the write process corresponding to each write command, the non-volatilization process controller 45 writes the data stored in the write buffer 42 into the nonvolatile memory 5 in units of data having a size corresponding to the unit of writing to the nonvolatile memory 5. The size corresponding to the unit of writing to the nonvolatile memory 5 depends on the configuration of the nonvolatile memory 5.

Although the size corresponding to the unit of writing is not limited, in one example, in the case where data is written to the nonvolatile memory 5 according to the TLC mode of writing and the page size of the nonvolatile memory 5 is 4 clusters (=16 KB), the unit of writing may be, for example, 12 clusters (=4 clusters×3 pages).

Every time the size of write data stored in the write buffer 42 reaches the unit size of writing, the non-volatilization process controller 45 writes the non-fractional data into the write destination block in the nonvolatile memory 5 by using the second NAND write processing circuit 47. The non-fractional data thus written has a size corresponding to the unit size of writing For example, when a size of write data corresponding to a certain write command is 18 clusters, the second NAND write processing circuit 47 for non-fractional data, under the control of the non-volatilization process controller 45, writes a part of the write data (non-fractional data) among the 18 clusters, that has a size corresponding to the unit size of writing, e.g., 12 clusters, into the block of the nonvolatile memory 5. The remainder of the write data, six clusters, which corresponds to unwritten fractional data and has a size smaller than the unit size of writing, remains stored in the write buffer 42.

By receiving write data corresponding to a subsequent write command, a total size of data stored in the write buffer 42 is increased. If the total size of the data stored in the write buffer 42 reaches the unit size of writing, the second NAND write processing circuit 47 for non-fractional data writes the data into the TLC block of the nonvolatile memory 5 under the control of the non-volatilization process controller 45.

In this manner, the write data corresponding to each received write command is written to the nonvolatile memory 5 in units having a size corresponding to the unit size of writing to the nonvolatile memory 5.

Although it is possible to write to the nonvolatile memory 5 even if a total size of the data stored in the write buffer 42 combined with a subsequent write data is smaller than the unit size of writing to the nonvolatile memory 5, in order to reduce the number of non-volatilization process to write fractional data to the nonvolatile memory 5, in the embodiments, a write process that targets the TLC block of the nonvolatile memory 5 is performed only after a total size of the data stored in the write buffer 42 reaches the unit size of writing.

Generally, the non-volatilization process is performed by receiving a command for requesting non-volatilization of data (for example, a flush command). However, there is a possibility that a write amplification factor (WAF) of the memory system 3 may increase and thus a lifetime of the memory system 3 becomes shorter if the non-volatilization process is executed every time a flush command is received.

When fractional data remains, in order to write the fractional data to the nonvolatile memory 5, padding is performed in the related art by adding dummy data to the fractional data. However, in this case, it is necessary to perform padding as many times as the fractional data occurs.

Alternatively, in the related art, in order to reduce the number of times padding is executed, fractional data is temporarily saved in another area of the nonvolatile memory 5 that has a unit size of writing smaller than the unit size of writing to a TLC block (for example, the fractional data is temporarily saved in an SLC block with SLC mode of writing). However, even in this case, it is eventually necessary to write the fractional data saved in the SLC block into the TLC block. As the number of write operations increases, the write amplification factor (WAF) of the memory system 3 may be increased.

Figure 2:
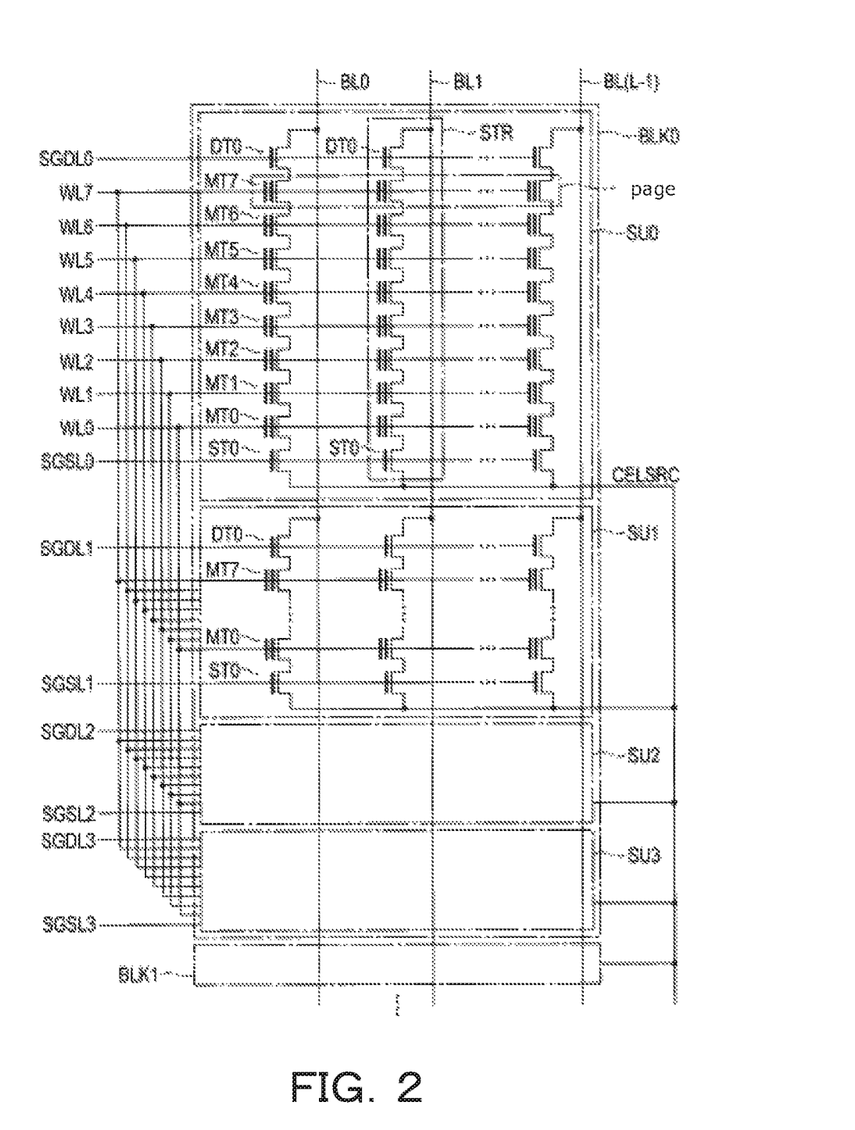
FIG. 2 is a diagram showing a configuration example of a memory block of a nonvolatile memory included in the memory system according to the embodiment.

FIG. 2 is a diagram showing a configuration example of a memory block of a nonvolatile memory included in the memory system according to the embodiment.

One block BLK (here, BLK0) may include string units SU0 to SU3. Since the string units SU0 to SU3 have the same configuration, the configuration of the string unit SU0 will be described below.

The string unit SU0 is connected to a plurality of word lines WL0 to WL7 (for example, eight word lines) and a plurality of bit lines BL0 to BL (L-1) (for example, the number L of bit lines). The string unit SU0 includes L NAND strings STR corresponding to the plurality of bit lines BL0 to BL (L-1).

Each NAND string STR includes two select gate transistors DT0 and ST0 and a plurality of memory cell transistors MT (MT0 to MT7) (for example, eight memory cell transistors). The select gate transistor DT0, the memory cell transistors MT0 to MT7, and the select gate transistor ST0 are connected in series in this order between one bit line BL and a common source line CELSRC.

Also, each of the plurality of bit lines BL0 to BL (L-1) is commonly connected to the corresponding NAND string STR of each of the string units SU0 to SU3.

Each memory cell transistor MT functions as a memory cell. Each memory cell transistor MT includes a control gate and a charge storage layer. Control gates of the plurality of memory cell transistors MT0 to MT7 are respectively connected to the corresponding plurality of word lines WL0 to WL7. A gate of the select gate transistor ST0 is connected to a select gate line SGSL0. A gate of select gate transistor DT0 is connected to a select gate line SGDL0.

For example, in any string unit SU of each block BLK, a set of memory cell transistors MT connected to the same word line WL is referred to as a page. When a nonvolatile memory 5 is TLC NAND flash memory, in any string unit SU, a set of memory cell transistors MT connected to the same word line WL has three pages (lower page, middle page, and upper page).

The plurality of word lines WL (WL0 to WL7) are commonly connected to the string units SU0 to SU3. Therefore, with respect to one word line, a set of memory cell transistors MT connected to this word line has four groups in one block BLK (that is, a group of memory cell transistors MT belongs to the string unit SU0, a group of memory cell transistors MT belongs to the string unit SU1, a group of memory cell transistors MT belongs to the string unit SU2, and a group of memory cell transistors MT belongs to the string unit SU3). Each one of the four groups is one unit of writing.

Figure 3:
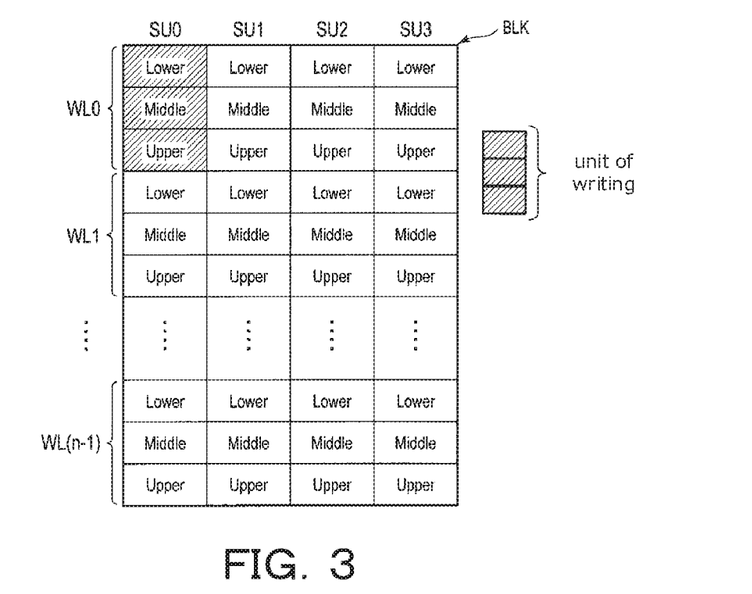
FIG. 3 is a diagram which shows an example of a unit of writing to the nonvolatile memory when data is written to the nonvolatile memory according to a triple level cell (TLC)-mode of writing.

FIG. 3 is a diagram which shows an example of unit of writing to the nonvolatile memory when data is written to the nonvolatile memory according to a triple level cell (TLC)-mode of writing.

Each block BLK provided in the nonvolatile memory 5 includes a set of memory cell transistors connected to word line WL 0, a set of memory cell transistors connected to word line WL 1, . . . , and a set of memory cell transistors connected to word line WL (n-1). The block BLK is used as the TLC block described above.

As shown in FIG. 3, in the operation of writing data for a block BLK, first, data corresponding to three pages (lower page, middle page, and upper page) is written into the memory cell transistor group connected to word line WL0 and belonging to string unit SU0. Then, data corresponding to three pages (lower page, middle page, and upper page) is written into the memory cell transistor group connected to word line WL0 and belonging to string unit SU1. After data corresponding to three pages (lower page, middle page, and upper page) is written into the memory cell transistor group belonging to string unit SU3 of word line WL0, the word line to write data is changed to WL1 from WL0.

Therefore, memory cell transistor groups connected to the same word line and belonging to the same string unit function as one writing unit. The size corresponding to the writing unit is the size of data for three pages (lower page, middle page, upper page) written to the memory cell transistor groups connected to the same word line and belonging to the same string unit.

Figure 4:
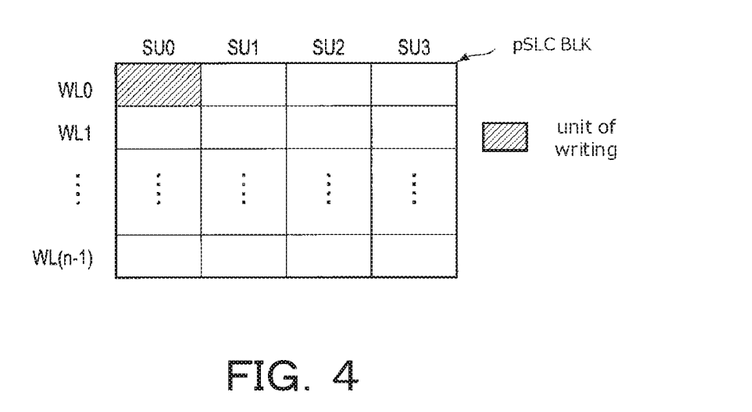
FIG. 4 is a diagram which shows an example of a unit of writing to the nonvolatile memory when data is written to the nonvolatile memory according to a single level cell (SLC) mode of writing.

FIG. 4 is a diagram which shows an example of unit of writing to the nonvolatile memory when data is written to the nonvolatile memory according to a single level cell (SLC) mode of writing.

When writing data into the certain block in the SLC mode, only data corresponding to one page is written into memory cell transistors connected to the same word line and belonging to the same string unit. This block is called an SLC block or a pseudo SLC (pSLC) block.

The size of the writing unit applied to the pSLC block is the size corresponding to one page written to the memory cell transistor group connected to the same word line and belonging to the same string unit.

Figure 5:
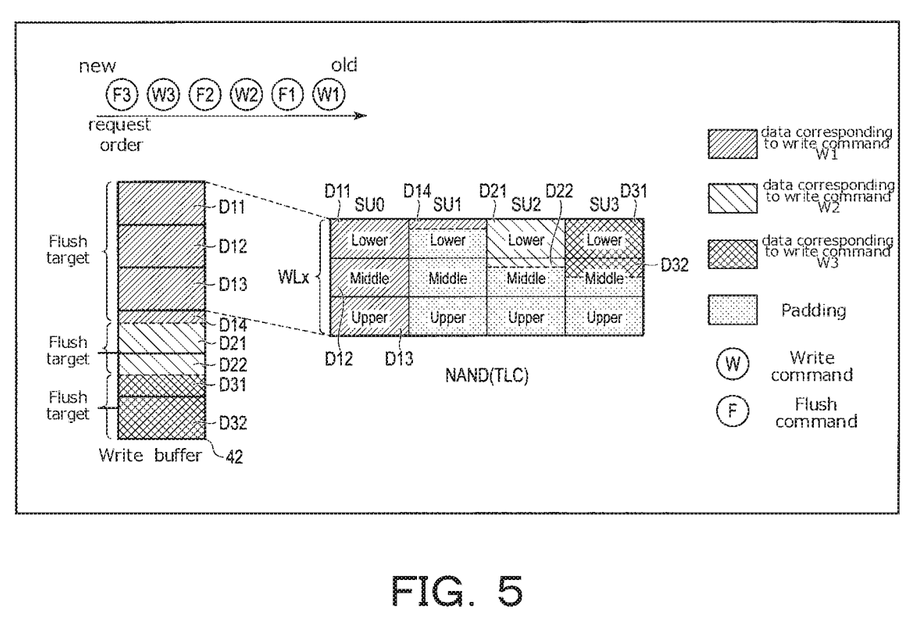
FIG. 5 is a diagram showing an example of writing fractional data into a TLC block of NAND flash memory during a non-volatilization process, according to a first comparative example.

FIG. 5 is a diagram showing an example of writing fractional data into a TLC block of NAND flash memory during a non-volatilization process, according to a first comparative example.

In FIG. 5, it is assumed that the memory system 3 receives commands in the order of write command W1, flush command F1, write command W2, flush command F2, write command W3, and flush command F3. Write data (D11 to D14) corresponding to the write command W1 has a size slightly larger than the unit of writing (i.e. 3 pages of data) to the TLC NAND flash memory. The flush command F1 is issued by the host 2 following the write command W1. In the write buffer 42, write data (D11 to D14) are stored. In this case, the entire write data (D11 to D14) including a fractional data (for example, herein D14) is a target (i.e. flush target) of the non-volatilization process to be written into the TLC NAND flash memory.

Three pages of data (D11, D12, and D13) corresponding to the unit of writing are written into a write destination block (TLC block) in the TLC NAND flash memory. In this TLC block, three pages of data (D11, D12, and D13) are written into a memory cell transistor group connected to a certain word line WLx and belonging to the string unit SU0.

Next, padding to add dummy data to the fractional data (D14) is performed, thereby three pages of data including the data D14 and the dummy data, corresponding to the unit of writing, is written into the memory cell transistor group connected to word line WLx and belonging to string unit SU1.

Thus, the non-volatilization process of the write data (D11 to D14) corresponding to the write command W1 is completed, and the write data (D11 to D14) is discarded from the write buffer 42.

Next, the non-volatilization process shifts to a write processing of write data (D21, D22) corresponding to the write command W2. The size of the write data (D21, D22) corresponding to the write command W2 is, for example, 1 page+α (α<1 page). Therefore, the write data (D21, D22) is fractional data because the size of the write data (D21, D22) is less than the unit of writing (which is 3 pages). Following the write command W2, the host 2 issues flush command F2 when the write data (D21, D22) is stored in the write buffer 42. In this case, the entire write data (D21, D22) is a target of the non-volatilization process (flush target) but is fractional data that does not satisfy the unit size of writing.

At this point, fractional data stored in the write buffer 42 is the only write data (D21, D22). Therefore, padding to add dummy data to the write data (D21, D22) is performed, thereby three pages of data including the data D21, D22, and the dummy data, corresponding to the unit of writing, is written into the memory cell transistor group connected to the word line WLx and belonging to the string unit SU2.

After the non-volatilization process of the write data (D21, D22) corresponding to the write command W2 is completed, the write data (D21, D22) is discarded from the write buffer 42.

Next, the non-volatilization process shifts to a write processing of write data (D31, D32) corresponding to the write command W3. The write data (D31, D32) corresponding to the write command W3 is, for example, fractional data having a size of about 1.5 pages, that does not satisfy the unit size of writing. Following the write command W3, the host 2 issues a flush command F3 when the write buffer 42 stores the write data (D31, D32) which is fractional data. In this case, the entire write data (D31, D32), which is fractional data, is the target of the non-volatilization process (flush target).

At this point, fractional data stored in the write buffer 42 is the only write data (D31, D32). Therefore, padding to add dummy data to the write data (D31, D32) is performed, whereby three pages of data corresponding to the unit of writing is written into the memory cell transistor group connected to the word line WLx and belonging to the string unit SU3.

As described above, in the case where the memory system consecutively receives a plurality of pairs of write command and flush command, it is necessary to execute the non-volatilization process every time, even for fractional data. As a result, the write amplification factor (WAF) may be increased.

Figure 6:
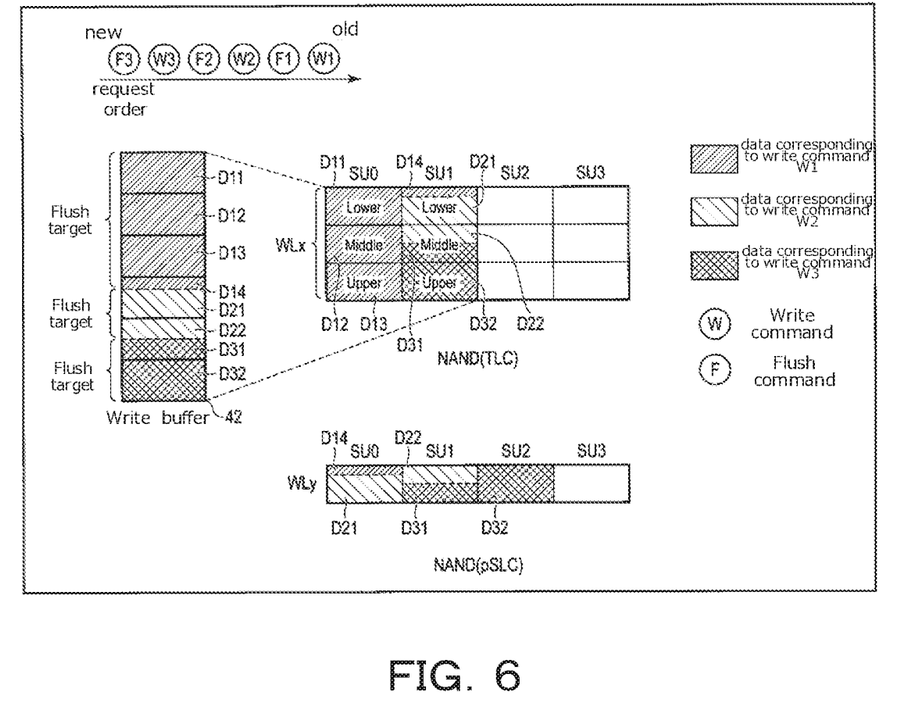
FIG. 6 is a diagram showing an example of temporarily saving fractional data into a pseudo SLC block of NAND flash memory during a non-volatilization process, according to a second comparative example.

FIG. 6 is a diagram showing an example of temporarily saving fractional data into a pSLC block of NAND flash memory during a non-volatilization process, according to a second comparative example.

Three pages of data (D11, D12, D13) are written into a write destination block (TLC block) in the TLC NAND flash memory. In this TLC block, three pages of data (D11, D12, D13) are written into a memory cell transistor group connected to a certain word line WLx and belonging to the string unit SU0. Next, fractional data (D14) is temporarily saved to the pSLC block. In the pSLC block, memory cell transistors connected to word line WLy and belonging to string unit SU0 form one page. In the pSLC block, the data may be written in units smaller than the page size. In the pSLC block, the fractional data (D14) is written in SLC mode into a part of the memory cell transistor group connected to the word line WLy and belonging to the string unit SU0.

Consequently, the non-volatilization process of the write data (D11 to D14) corresponding to the write command W1 is completed, and the write data (D11 to D14) is discarded from the write buffer 42.

Next, the non-volatilization process shifts to the write processing of write data (D21, D22) corresponding to write command W2. The write data (D21, D22) corresponding to the write command W2 is fractional data whose size is 1 page+α. Since the flush command F2 is received following the write command W2, the entire write data (D21, D22) which is the fractional data becomes a target of the non-volatilization process (flush target).

At this point, fractional data stored in the write buffer 42 is the only write data (D21, D22). Therefore, the controller 4 temporarily saves the write data (D21, D22), which is fractional data, into the pSLC block.

In this case, the fractional data (D21) is written with the SLC mode into the remaining part of the memory cell transistor group connected to the word line WLy and belonging to the string unit SU0. The fractional data (D22) is written into a part of the memory cell transistor group connected to the word line WLy and belonging to the string unit SU1.

Thus, the non-volatilization process of the write data (D21, D22) corresponding to the write command W2 is completed. The controller 4 discards the write data (D21, D22) from the write buffer 42.

Next, the process shifts to the write processing of write data (D31, D32) corresponding to write command W3. The write data (D31, D32) corresponding to the write command W3 is fractional data having a size of about 1.5 pages. Since the flush command F3 is received following the write command W3, the entire write data (D31, D32) which is fractional data becomes a target of the non-volatilization process (flush target).

At this point, fractional data stored in the write buffer 42 is the only write data (D31, D32). Therefore, the controller 4 temporarily saves the write data (D31, D32) which is the fractional data in the pSLC block.

In this case, the data (D31) is written with SLC mode into the remaining part of the memory cell transistor group connected to word line WLy and belonging to string unit SU1, and the data (D32) is written with the SLC mode into the memory cell transistor group connected to word line WLxy and belonging to the string unit SU2.

Thus, the number of times padding is performed can be reduced by temporarily saving fractional data into the pSLC block. However, data temporarily saved into the pSLC block (D14, D21, D22, D31, D32) must eventually be written into the TLC block of the TLC NAND flash memory. Thus, the write amplification factor (WAF) of the memory system 3 may be increased.

Figure 7:
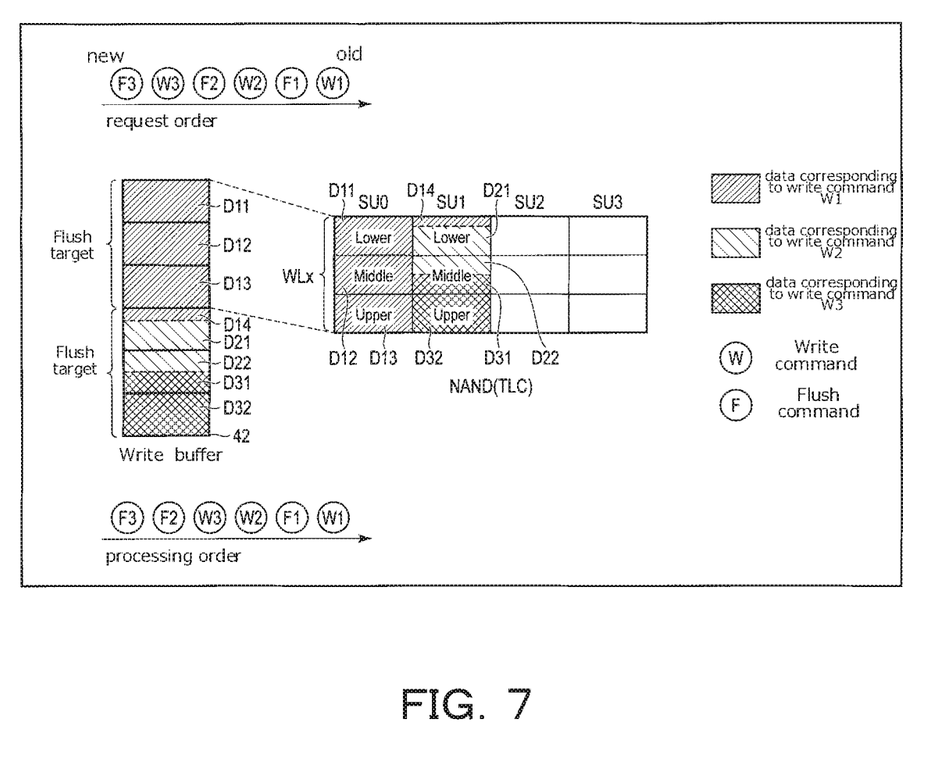
FIG. 7 is a diagram showing an example of non-volatilization process of the memory system according to the embodiment.

FIG. 7 is a diagram showing an example of non-volatilization process of the memory system according to the embodiment.

In the embodiment, when the memory system 3 receives a command for requesting a non-volatilization process of the data (e.g., the command is flush command), the non-volatilization process controller 45 provided in the controller 4 suspends an execution of the non-volatilization process if the fractional data has a size smaller than the unit size of writing. That is, the process of temporarily saving fractional data into the pSLC block is not executed. The process of writing fractional data into TLC NAND flash memory using padding is not also executed.

Then, after when a total size of the current data in the write buffer 42 including the fractional data reaches the unit size of writing, the non-volatilization process controller 45 performs a non-volatilization process to write the write data into the nonvolatile memory 5 (for example, TLC NAND flash memory). Furthermore, the non-volatilization process controller 45 also returns to the host 2 the notification of completion of the flush command for which the execution of the non-volatilization process has been suspended.

As described, in the embodiment, the non-volatilization process controller 45 of the controller 4 temporarily suspends the execution of the non-volatilization process corresponding to the flush command. After a set of the write data is collected so as to correspond to the unit size of writing, the non-volatilization process controller 45 performs writing data having the unit size of writing into the nonvolatile memory 5 and notifies the host 2 of the completion of the flush command.

Accordingly, a period of time from receiving the flush command to returning a notification of completion of the flush command to the host 2 becomes longer. However, because temporarily saving the fractional data in the pSLC block and writing the fractional data with a padding to add dummy data into the TLC NAND flash memory are not executed, the writing efficiency can be improved.

Hereinafter, a case where the memory system 3 receives commands in the order of the write command W1, the flush command F1, the write command W2, the flush command F2, the write command W3, and the flush command F3 will be described as the non-volatilization process executed by the non-volatilization process controller 45.

A write process of write data (D21, D22) corresponding to the write command W1 is performed. The write data (D11 to D14) corresponding to the write command W1 has a size slightly larger than the unit size of writing (data for 3 pages) of the TLC NAND flash memory. Three pages of data (D11, D12, and D13) in the write buffer 42 is written into a write destination block (TLC block) in the TLC NAND flash memory. In this TLC block, three pages of data (D11, D12, and D13) is written into a memory cell transistor group connected to a certain word line WLx and belonging to the string unit SU0.

At this time, data stored in the write buffer 42 is fractional data (D14). Therefore, the non-volatilization process controller 45 suspends execution of the non-volatilization process of writing the fractional data (D14) into the nonvolatile memory 5, or execution of the non-volatilization process corresponding to the flush command F1. In this case, neither the process of writing the fractional data (D14) into the TLC NAND flash memory using padding nor the process of saving the fractional data (D14) to the pSLC block is performed. Therefore, the fractional data (D14) is maintained in the write buffer 42.

Since the non-volatilization process is performed on a part (D11, D12, and D13) of the write data (D11 to D14) corresponding to the write command W1, actually, non-volatilization process corresponding to the flush command F1 is complete only partially. However, since the non-volatilization process of the fractional data (D14) is suspended, at this time, the non-volatilization process controller 45 does not return a notification of completion of the flush command F1 to the host 2.

The non-volatilization process controller 45 suspends the execution of the non-volatilization process corresponding to the flush command F1, and then waits for the total size of the current data in the write buffer 42 to reach the size corresponding to the unit size of writing to TLC NAND flash memory when subsequent write data is received.

Here, the execution of the non-volatilization process corresponding to each flush command received is suspended during a time period from when the non-volatilization process of writing the fractional data (D14) into the nonvolatile memory 5 is suspended to when the total size of the current data in the write buffer 42 reaches the unit size of writing.

Subsequently, the non-volatilization process controller 45 executes the following processing.

The process shifts to the write processing of the write data (D21, D22) corresponding to the write command W2. In the processing of the write command W2 and the subsequent flush command F2, the non-volatilization process controller 45 calculates the total size of the current data in the write buffer 42, including fractional data (D14) and write data (D21, D22) corresponding to the write command W2. The non-volatilization process controller 45 determines whether the total size of the current data in the write buffer 42 is less than the unit size of writing to the TLC NAND flash memory.

If the total size of the current data in the write buffer 42 is less than the unit size of writing, the non-volatilization process controller 45 suspends non-volatilization process corresponding to the flush command F2. That is, the non-volatilization process controller 45 suspends non-volatilization process of writing the current data in the write buffer 42, including the fractional data (D14) and the write data (D21, D22), to the nonvolatile memory 5.

In this case, neither the process of writing the current data in the write buffer 42 (fractional data (D14) and the subsequent write data (D21, D22)) to the TLC NAND flash memory using padding, nor the process of saving the data into the pSLC block are executed, and such data is maintained in the write buffer 42.

Subsequently, the process shifts to the write processing of the write data (D31, D32) corresponding to the write command W3. In the processing of the write command W3 and the subsequent flush command F3, the non-volatilization process controller 45 calculates the total size of the current data in the write buffer 42, including the fractional data (D14), write data (D21, D22) corresponding to the write command W2, and subsequent write data (D31, D32) corresponding to the write command W3.

The non-volatilization process controller 45 determines whether the total size of the current data in the write buffer 42 is less than the unit size of writing to the TLC NAND flash memory.

When the total size of the current data in the write buffer 42 has reached the unit size of writing, the non-volatilization process controller 45 writes the data (D14, D21, D22, D31, and D32) into the memory cell transistor group connected to the word line WLx and belonging to the string unit SU1.

Then, the non-volatilization process controller 45 returns to the host 2 a notification of completion of the flush command F1, a notification of completion of the flush command F2, and a notification of completion of the flush command F3.

When the size of the write data corresponding to the write command W3 is large and the size of the current data to be written is equal to the unit size of writing+α, part of the non-volatilization process of the write data corresponding to the write command W3 is executed, and the execution of the non-volatilization process of the remaining part of the write data (fractional data) is suspended. Therefore, at this time, the non-volatilization process controller 45 returns only a notification of completion of the flush command F1 and a notification of completion of the flush command F2 to the host 2, and does not return a notification of completion of the flush command F3 to the host 2.

Thereafter, when the total size of the remaining part of the write data (fractional data) corresponding to the write command W3 and the fractional data of the subsequent write data reaches the unit size of writing, writing into the nonvolatile memory 5 is performed.

As described above, according to the embodiment, it is possible to reduce the number of times the fractional data is written into the nonvolatile memory 5 and to improve the writing efficiency.

Figure 8:
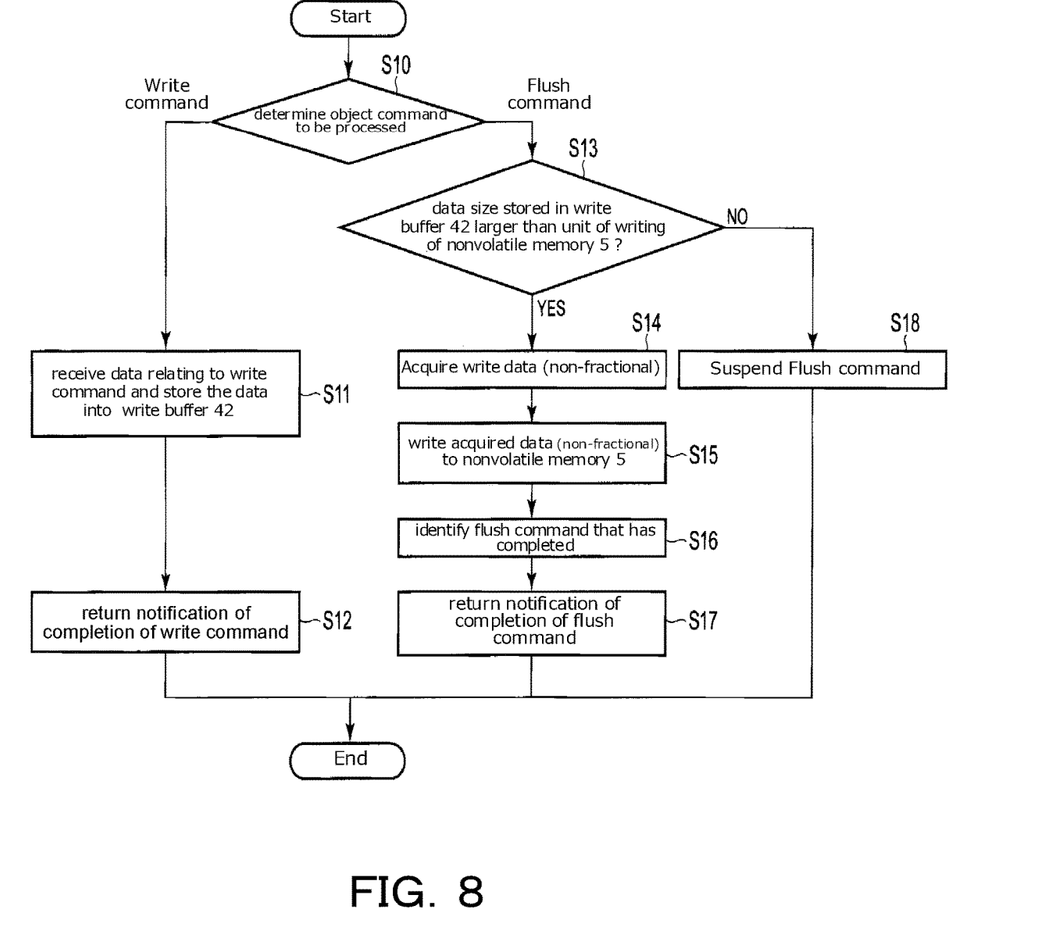
FIG. 8 is a flowchart showing the steps of the non-volatilization process of the memory system according to the embodiment.

FIG. 8 is a flowchart showing the steps of the non-volatilization process of the memory system according to the embodiment.

The write buffer processing circuit 44 of the controller 4 acquires one command to be processed requested by the host 2 from the group of commands stored in the command queue 44A. Then, the write buffer processing circuit 44 acquires the command to be processed (step S10).

When it is determined that the command to be processed acquired in S10 is a write command (S10, write command), the write buffer processing circuit 44 of the controller 4 receives the write data corresponding to the write command to be processed. Then, the write data is stored in the write buffer 42 (step S11). In step S11, the write buffer processing circuit 44 acquires the write data corresponding to the write command from the host based on the data pointer and the length specified by the write command, and stores the acquired write data in the write buffer 42.

When the storage of the write data is completed, the controller 4 returns a notification of completion of the write command to the host 2 (step S12), and ends the processing (end).

On the other hand, when the write buffer processing circuit 44 acquired in S10 determines that the command to be processed is a flush command (S10, flush command), the non-volatilization process controller 45 of the controller 4 determines the size of write data stored in the write buffer 42. Then, the non-volatilization process controller 45 determines whether the size of the write data stored in the write buffer 42 is equal to or more than the unit size of writing to the nonvolatile memory 5, which is the TLC NAND flash memory (step S13).

When it is determined that the size of the write data stored in the write buffer 42 is equal to or larger than the unit size of writing to the nonvolatile memory 5 (step S13, YES), the non-volatilization process controller 45 acquires a part of the write data (non-fractional data) corresponding to the unit size of writing to the nonvolatile memory 5 from the write buffer 42 (step S14), and stores the acquired write data (non-fractional data) in the nonvolatile memory 5 (step S15).

When it is determined that the size of the write data stored in the write buffer 42 is not equal to or larger than the unit size of writing to the nonvolatile memory 5 (step S13, NO), the non-volatilization process controller 45 suspends processing of the flush command (step S18), and the process is ended (end).

After the non-volatilization process of S15 is completed, the non-volatilization process controller 45 identifies the flush command for which the processing has been completed (step S16). In step S16, a plurality of flush commands may be identified, including the flush command suspended in S18. Then, the non-volatilization process controller 45 returns a notification of completion of the flush command specified in S16 to the host 2 (step S17), and ends the processing (end).

In this manner, each time write data having a unit size of writing (non-fractional data) is aligned in the write buffer 42, non-volatilization processing to write the non-fractional data into the TLC NAND flash memory is performed. As a result, the data remaining in the write buffer 42 is only fractional data.

Figure 9:
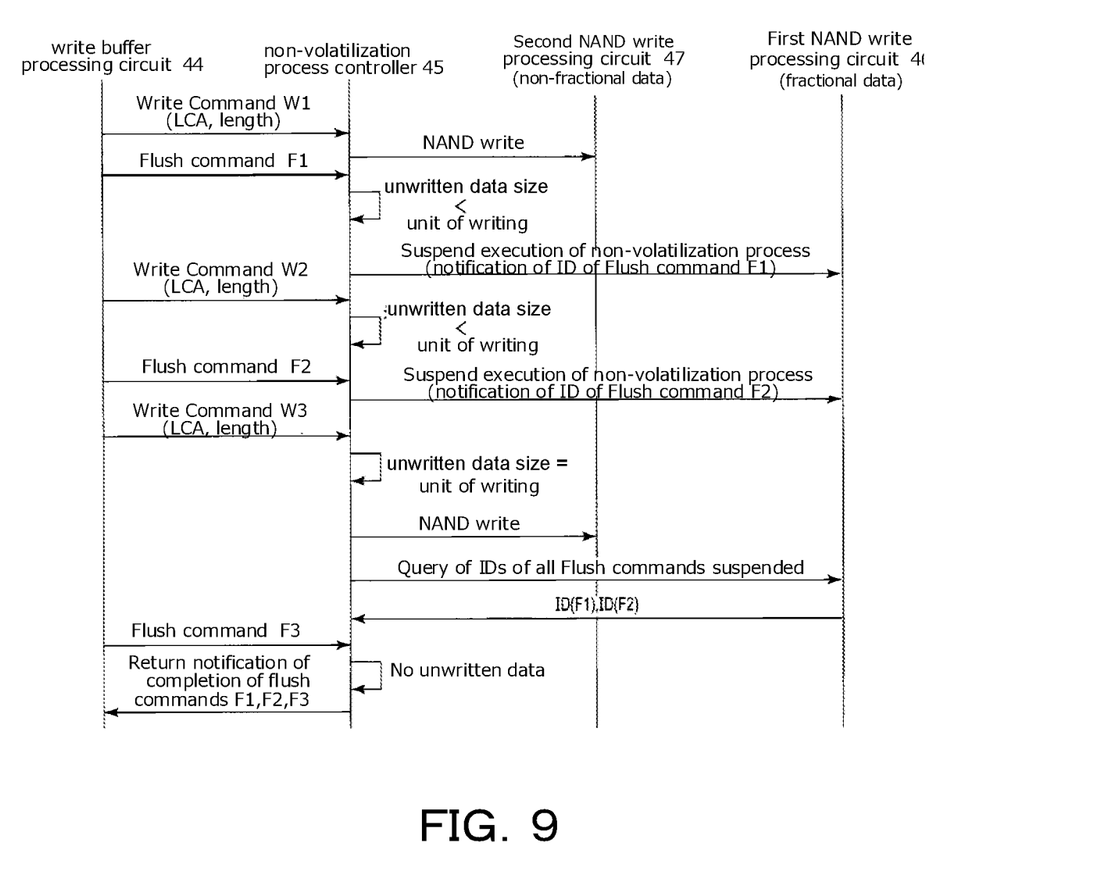
FIG. 9 is a sequence diagram showing commands issued during the non-volatilization process between components of the memory system according to the embodiment.

FIG. 9 is a sequence diagram showing commands issued during the non-volatilization process between components of the memory system according to the embodiment.

In FIG. 9, as in FIG. 7, it is assumed that the memory system 3 receives commands in the order of write command W1, flush command F1, write command W2, flush command F2, write command W3, and flush command F3.

The write buffer processing circuit 44 acquires the write data corresponding to the write command W1 from the host memory and stores the write data into the write buffer 42. After the write data corresponding to the write command W1 is stored into the write buffer 42, the write buffer processing circuit 44 notifies the non-volatilization process controller 45 of the content of the write command W1 (LCA, length).

The non-volatilization process controller 45 is able to recognize that the size of the write data stored in the write buffer 42 is equal to or larger than the unit size of writing based on the length designated by the write command W1. In this case, the non-volatilization process controller 45 writes the write data (non-fractional data) stored in the write buffer 42 in the TLC NAND flash memory using the second NAND write processing circuit 47 for non-fractional data.

The write buffer processing circuit 44 sends the flush command F1 to the non-volatilization process controller 45.

When the non-volatilization process controller 45 receives the flush command F1 from the write buffer processing circuit 44, the non-volatilization process controller 45 determines whether or not the size of the data stored in the write buffer 42 is less than the unit size of writing to the TLC NAND flash memory. Since the current data stored in the write buffer 42 is only fractional data D14, the size of the current data stored in the write buffer 42 is smaller than the unit size of writing. In this case, the non-volatilization process controller 45 suspends the execution of the non-volatilization process corresponding to the flush command F1 so that the fractional data D14 is maintained in the write buffer 42 without being saved into the pSLC block (and without being written into the TLC NAND flash memory).

Then, the non-volatilization process controller 45 notifies the first NAND write processing circuit 46 for fractional data of the identifier of the flush command F1 (ID). In order to remember the flush command for which the execution of the non-volatilization process is suspended, the ID of the flush command F1 is transmitted to the first NAND write processing circuit 46 for fractional data.

The write buffer processing circuit 44 acquires the write data corresponding to the write command W2 from the host memory and stores the write data into the write buffer 42. After the write data corresponding to the write command W2 is stored into the write buffer 42, the write buffer processing circuit 44 notifies the non-volatilization process controller 45 of the content of the write command W2 (LCA, length).

The non-volatilization process controller 45 calculates the size of the current data stored in the write buffer 42 by adding the length designated by the write command W2 to the size of the fractional data D14. Then, the non-volatilization process controller 45 determines whether or not the size of the current data stored in the write buffer 42 is smaller than the unit size of writing to the TLC NAND flash memory. At this time, since the current data stored in the write buffer 42 is only the fractional data D14 and the write data D21 and D22, the size of the current data is still less than the unit size of writing. For this reason, at this time, the non-volatilization process for writing the such data into the TLC NAND flash memory is not performed.

The write buffer processing circuit 44 sends the flush command F2 to the non-volatilization process controller 45. The size of the current data in the write buffer 42 is less than the unit size of writing to the TLC NAND flash memory. Therefore, the non-volatilization process controller 45 performs the non-volatilization process corresponding to flush command F2 so that the data (D14, D21, D22) is maintained in the write buffer 42 without being saved into the pSLC block (and without being written into the TLC NAND flash memory). Then, the non-volatilization process controller 45 transmits the identifier of the flush command F2 (ID) to the first NAND write processing circuit 46 for fractional data.

The write buffer processing circuit 44 acquires the write data corresponding to the write command W3 from the host memory and stores the write data into the write buffer 42. After the write data corresponding to the write command W3 is stored into the write buffer 42, the write buffer processing circuit 44 notifies the non-volatilization process controller 45 of the content of the write command W3 (LCA, length).

The non-volatilization process controller 45 calculates the size of the current data stored in the write buffer 42 by adding the length designated by the write command W3 to the size of the data (D14, D21, D22). Then, the non-volatilization process controller 45 determines whether or not the size of the current data in the write buffer 42 is smaller than the unit size of writing to the TLC NAND flash memory.

In the embodiment, the size of the current data (D14, D21, D22, D31, and D32) matches the unit size of writing.

Therefore, the non-volatilization process controller 45 writes the current data (D14, D21, D22, D31, and D32) stored in the write buffer 42 in TLC NAND flash memory by using the second NAND write processing circuit 47 for non-fractional data.

The non-volatilization process controller 45 inquires the first NAND write processing circuit 46 for fractional data for the IDs of all flush commands for which non-volatilization process has been suspended. Thus, the non-volatilization process controller 45 acquires the ID of the flush command F1 and the ID of the flush command F2 from the first NAND write processing circuit 46 for fractional data. Then, the non-volatilization process controller 45 is ready to return a notification of completion of the flush command F1 and a notification of completion of the flush command F2 to the host 2 via the write buffer processing circuit 44.

In the embodiment, the next flush command F3 is notified from the write buffer processing circuit 44 to the non-volatilization process controller 45. At this time, all the write data corresponding to all preceding write commands W1 to W3 have already performed non-volatilization. Therefore, data does not exist in the write buffer 42.

Then, the non-volatilization process controller 45 may collectively return a notification of completion of the flush command F1, a notification of completion of the flush command F2, and a notification of completion of the flush command F3 to the host 2 via the write buffer processing circuit 44.

When the size of the unwritten data (D14, D21, D22, D31, and D32) is larger than the unit size of writing, the non-volatilization process controller 45 writes only non-fractional data having a size corresponding to the unit size of writing into the TLC NAND flash memory among the unwritten data (D14, D21, D22, D22, D31, and D32). Then, the non-volatilization process controller 45 returns a notification of completion of the flush command F1 and a notification of completion of the flush command F2 to the host 2 via the write buffer processing circuit 44. Then, the write buffer processing circuit 44 sends the flush command F3 to the non-volatilization process controller 45.

At this time, the current data in the write buffer 42 is only fractional data. Therefore, the non-volatilization process controller 45 suspends non-volatilization process corresponding to the flush command F3 so that the fractional data is maintained in the write buffer 42 without being saved into the pSLC block (and without being written into the TLC NAND flash memory).

As described above, according to the embodiment, when the memory system 3 receives a command for requesting non-volatilization of data (for example, a flush command), the execution of the non-volatilization process to write fractional data into the nonvolatile memory 5 is temporarily suspended and after enough data (greater than or equal to the unit size of writing) is collected in the write buffer 42, the processing of writing the data to the non-volatilization memory 5 and the processing of notifying the host 2 of a completion of the flush command are executed. As a result, although it takes a longer time to return a notification of completion of the flush command to the host 2, since neither processing for temporarily saving fractional data into a pSLC block nor the processing of writing fractional data into the TLC NAND flash memory by using padding are performed, writing efficiency can be improved. Therefore, it is possible to suppress an increase in the write amplification factor (WAF).

Also, when another flush command is received before the total size of the current data reaches the unit size of writing, the controller 2 suspends the execution of the non-volatilization process to write the current data in the write buffer 42 into the nonvolatile memory 5, that is, the non-volatilization process corresponding to this other flush command. Then, when the total size of the current data in the write buffer 42 reaches the unit size of writing, the execution of the non-volatilization process for writing the current data in the write buffer 42 into the non-volatilization memory 5 and processing of returning a notification of completion of these suspended flush commands to the host 2 are executed.

Therefore, even in the case where a plurality of pairs of write command and flush command are continuously received, the processing of temporarily saving fractional data into pSLC block, and the processing to write fractional data into TLC NAND flash memory by using padding are not performed. Therefore, the writing efficiency is significantly improved as compared to the processing of temporarily saving the fractional data into the pSLC block each time a flush command is received, and the processing of writing the fractional data into the TLC NAND flash memory by using padding.

In the embodiment, NAND flash memory is illustrated as a nonvolatile memory. However, the function of the embodiment may be applied to various nonvolatile memories, for example, magnetoresistive random access memory (MRAM), phase change random access memory (PRAM), resistive random access memory (ReRAM), and ferroelectric random access memory (FeRAM).

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory system including:
   a volatile memory;
   a nonvolatile memory; and
   a controller circuit configured to control the volatile memory and the nonvolatile memory and to perform a write process and a non-volatilization process, wherein the controller circuit is further configured to
   during the write process, store write data in the volatile memory, and
   during the non-volatilization process, upon determining that a data size of the write data stored in the volatile memory is less than a unit of writing of the nonvolatile memory, suspend completion of the non-volatilization process and not return a notification of completion of the non-volatilization process, and upon determining that none of the write data remains in the volatile memory after storing non-fractional data stored in the volatile memory in the nonvolatile memory, return the notification of completion of the non-volatilization process.

2. The memory system according to claim 1, wherein the write process is performed in response to a write command and the non-volatilization process is performed in response to a flush command.

3. The memory system according to claim 1, wherein the write process and the non-volatilization process are performed in response to a write command with force unit access (FUA) enabled.

4. The memory system according to claim 1, wherein the controller circuit is further configured to:
   during the non-volatilization process, upon determining that the data size of the write data stored in the volatile memory is not less than the unit of writing of the nonvolatile memory, acquire the non-fractional data stored in the volatile memory, store the non-fractional data stored in the volatile memory into the nonvolatile memory, identify that the non-volatilization process has completed, and return the notification of completion of the non-volatilization process.

5. The memory system according to claim 4, wherein the non-fractional data has a data size equal to an integer multiple of unit size of writing to the nonvolatile memory.

6. The memory system according to claim 1, wherein the controller circuit is further configured to:
   after storing the write data into the volatile memory, return a notification of completion of the write process.

7. A method for controlling a memory system, the method comprising:
   storing write data in a volatile memory;
   upon determining that a data size of the write data stored in the volatile memory is less than a unit of writing of a nonvolatile memory, suspending completion of a non-volatilization process and not returning a notification of completion of the non-volatilization process; and
   upon determining that none of the write data remains in the volatile memory after storing non-fractional data stored in the volatile memory in the nonvolatile memory, returning the notification of completion of the non-volatilization process.

8. The method according to claim 7, wherein the write data is stored in the volatile memory in response to a write command and the non-volatilization process is performed in response to a flush command.

9. The method according to claim 7, wherein the write data is stored in the volatile memory and the non-volatilization process is performed, both in response to a write command with force unit access (FUA) enabled.

10. The method according to claim 7, further comprising:
    upon determining that the data size of the write data stored in the volatile memory is not less than the unit of writing of the nonvolatile memory, acquiring the non-fractional data stored in the volatile memory, performing the non-volatilization process by storing the non-fractional data stored in the volatile memory in the nonvolatile memory, identifying that the non-volatilization process has completed, and returning the notification of completion of the non-volatilization process.

11. The method according to claim 10, wherein the non-fractional data has a data size equal to an integer multiple of unit size of writing to the nonvolatile memory.

12. The method according to claim 7, further comprising:
    after storing the write data in the volatile memory, returning a notification of completion of a write process.

13. A method for controlling a memory system, the method comprising:

storing first write data in a volatile memory in response to a first write command;

storing second write data in the volatile memory in response to a second write command;

performing a first non-volatilization process in response to a first flush command;

performing a second non-volatilization process in response to a second flush command; and notifying completion of the first and second write commands and of the first and second flush commands, in an order that is different from an order the write commands and flush commands were received.

14. The method according to claim 13, further comprising:

if a data size of data stored in the volatile memory is not less than a unit of writing of a nonvolatile memory, performing the first non-volatilization process in response to the first flush command; and if the data size of the data stored in the volatile memory is less than the unit of writing of the nonvolatile memory, not performing the first non-volatilization process in response to the first flush command.

15. The method according to claim 13, wherein the first flush command is issued prior to the second write command, and the completion of the second write command is notified prior to the completion of the first flush command is notified.

* * * * *